(12) United States Patent
Jacob et al.

(10) Patent No.: US 6,350,202 B1
(45) Date of Patent: Feb. 26, 2002

(54) CONSTANT VELOCITY FIXED JOINT WITH CONTROL ELEMENT

(75) Inventors: Achim Jacob, Kiel; Werner Jacob, Frankfurt, both of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/193,097

(22) Filed: Jan. 13, 2000

(30) Foreign Application Priority Data

Nov. 20, 1997 (DE) .......................................... 197 51 493

(51) Int. Cl.[7] ................................................. F16D 3/16
(52) U.S. Cl. ........................... 464/145; 464/15; 464/906
(58) Field of Search .......................... 469/15, 906, 145, 469/139, 141, 140, 142

(56) References Cited

U.S. PATENT DOCUMENTS

| | | | | |
|---|---|---|---|---|
| 1,975,758 A | * | 10/1934 | Stuber | 464/906 |
| 2,579,356 A | * | 12/1951 | Anderson | 464/145 |
| 2,615,317 A | * | 10/1952 | Rzeppa | 464/906 |
| 2,618,942 A | * | 11/1952 | Dodge | 464/906 |
| 3,310,960 A | * | 3/1967 | Cull | 464/144 |
| 3,789,624 A | * | 2/1974 | Camosso | 464/145 |
| 4,116,020 A | * | 9/1978 | Aucktor et al. | 464/145 |
| 4,610,643 A | * | 9/1986 | Krude | 464/143 |
| 5,201,107 A | * | 4/1993 | Mazzioti | 464/145 |
| 5,368,523 A | * | 11/1994 | Mazzioti | 464/144 |
| 5,453,052 A | | 9/1995 | Harz et al. | |
| 5,549,514 A | | 8/1996 | Welschof | |
| 5,823,883 A | * | 10/1998 | Hopson | 464/145 |
| 6,149,524 A | * | 11/2000 | Jacob | 464/15 |
| 6,174,240 B1 | * | 1/2001 | Jacob et al. | 464/145 |

FOREIGN PATENT DOCUMENTS

| | | |
|---|---|---|
| DE | 3904655 | 2/1990 |
| DE | 4208786 | 7/1993 |
| DE | 4441629 | 3/1996 |
| DE | 4228482 | 11/1996 |
| FR | 2 688 839 A1 | 9/1993 |
| GB | 1091714 | 11/1967 |
| GB | 1434531 | 5/1976 |

* cited by examiner

Primary Examiner—Lynne H. Browne
Assistant Examiner—Kenn Thompson

(57) ABSTRACT

A constant velocity fixed joint has an outer part 1, an inner part 9, a cage 18 and balls 23 which are guided by the cage 18 in the outer running grooves 5 of the outer part 1 and in the inner running grooves 14 of the inner part 9. The inner part 9 is held relative to the outer part 1 entirely by the balls 23 in the radial direction and by the ball 23 on the one hand and by a control element 24 on the other hand, which control element 24 is supported on the inner part 9 and on a supporting element 35 associated with the outer part 1. Beyond the advantageous supporting conditions achieved by said assembly, it is possible to achieve a further reduction in friction by friction-reducing means which are provided in the form of lubricating grooves 31, 33 for example, thus achieving hydro-dynamic lubrication conditions which are advantageously affected in that the control element 24 achieves high sliding speeds relative to the supporting element 35.

9 Claims, 2 Drawing Sheets

CONSTANT VELOCITY FIXED JOINT WITH CONTROL ELEMENT

BACKGROUND OF THE INVENTION

The invention relates to a constant velocity fixed joint which comprises an outer part, an inner part, a cage, balls and a control element. The outer part comprises a first longitudinal axis and a cavity centered on the axis. The inner face of the outer part is provided with outer running grooves which are circumferentially distributed around the first longitudinal axis. The inner part comprises a second longitudinal axis and, in its outer face, is provided with inner running grooves which are distributed around said second longitudinal axis. The number of inner running grooves corresponds to the number of outer running grooves, with the inner running grooves being arranged opposite the outer running grooves. Furthermore, the inner part is provided with an outer spherical face. The outer running grooves and inner running grooves are positioned opposite one another in pairs, and arranged in meridian planes relative to the associated longitudinal axis and extend in an undercut-free way from a first joint end.

The cage is provided with a hollow spherical partial face by means of which it is guided on the outer spherical face of the inner part. The cage is provided with windows which are circumferentially distributed in accordance with the outer running grooves and inner running grooves. The windows accommodate balls which engage the opposed running grooves for the purpose of transmitting torque. For this purpose they project radially outwardly and inwardly from the cage. The control element is supported on the inner part on the one hand and on a supporting element on the other hand.

U.S. Pat No. 5,376,052 describes such a constant velocity fixed joint wherein the control element comprises a spherical control face which engages a cavity of the inner part, which cavity is centered on the second longitudinal axis. The cavity forms a hollow spherical contact face, with the spherical control face resting thereagainst. Furthermore, the control element comprises a face which extends at a right angle relative to the first longitudinal axis and which supports the control element against a correspondingly extending face of the outer part in a way so as to be radially adjustable relative to the first longitudinal axis. Between the outer face of the cage and the inner face of the cavity of the outer part there is no area contact. In this way, any heat introduced into the inner part while the balls are transmitting torque only has to travel a short distance to reach the sliding region between the control element and the inner part.

U.S. Pat No. 5,453,052 describes a constant velocity fixed joint wherein the outer part and the inner part are provided with running grooves for receiving torque transmitting balls, which running grooves extend in an undercut-free way from one opening end. By means of its spherical outer face, the cage is supported in one direction against supporting elements fixed to the outer part in the region of the opening end. The supporting element is arranged in the region between two circumferentially adjoining outer running grooves. They extend wedge-like into the gap between the cylindrical part of the inner face of the cavity of the outer part and the spherical outer face of the cage. The inner part is supported in the direction opposed to the above-mentioned direction against a spherical dish-like holding element which rests against a spherical outer face of a ball cup in the cavity of the outer part. Otherwise, there is no contact between the outer face of the cage and the outer part. Contact is limited to the supporting elements secured to the outer part. There is no contact between the cage and the outer face of the inner part. Therefore, under torque, the cage is not supported on the inner part in the direction of the longitudinal axis of the outer part, but only on the small supporting elements and, via the holding element, on the outer part, because the outer part and inner part are loaded in opposite directions in the sense of being moved apart. This design leads to high loads and—because of the design of the supporting elements—to considerable friction.

It is the object of the invention to provide a low-friction constant velocity fixed joint wherein the losses during operation are correspondingly low.

SUMMARY OF THE INVENTION

In accordance with the invention, the objective is achieved by providing a constant velocity fixed joint wherein the outer tracks and inner tracks extend from a common first joint end in meridian planes in an undercut-free way and wherein the balls are supported on the window faces of the windows which are arranged near the first joint end. The outer face of the cage is arranged relative to the inner face of the cavity of the outer part in such a way that there exists a distance therebetween over the entire articulation range. Furthermore, the control element is provided with a spherical control face and with a guiding face. The proposed supporting element comprises a hollow spherical contact face against which the control element is supported by means of its control face. Furthermore, the control element is supported by means of its guiding face on a supporting face of the inner part, which supporting face is arranged in such a way that the second longitudinal axis of the inner part is positioned perpendicularly thereon. The supporting element is secured to the outer part or to a component connected to the outer part. The control element and the supporting element are arranged towards the first joint end from which the outer running grooves and inner running grooves extend in an undercut-free way.

The advantage of such a design is that the forces resulting from the transmission of torque at all angles of articulation are advantageously supported via the control element and the supporting element. There exists a further advantage in that, as compared to an assembly wherein the control element is supported against a hollow spherical face of the inner part, it is possible to reduce the number of faces which have to be produced accurately on the inner part. Furthermore, as compared to such a low-friction joint, the amount of friction is reduced even further.

Clear guidance is obtained because support is provided in one direction only and there is no expansion effect, so that there is no risk of jamming. In consequence, the components can be set advantageously relative to one another in the radial direction, taking into account the construction tolerances occurring. The shape of the outer ruing grooves and inner running grooves, and in particular, the way in which they extend from the first joint end towards the second joint end, is selected in such a way that, in all joint angle situations, the balls, when under torque, apply a force to the cage in the sense of applying a load to the window faces close to the first joint end, on which window faces the balls are supported. In this way it is ensured that the cage, by means of its hollow spherical face, is always held in contact with the outer spherical face of the inner part. Centering relative to the outer part in the radial direction is effected entirely by the balls, and in the axial direction, the unit of inner cage part and control element relative to the outer part is achieved by supporting same on the supporting element secured to the outer part. By classifying and dimensioning the components relative to the theoretical articulation center it is thus possible to ensure that all components match one another in such a way that they come as close as possible to the optimum alignment of their operating faces relative to the theoretical joint articulation center.

According to a further embodiment of the invention it is proposed that the control element is dish-shaped. In this way it is possible to achieve a component which can be produced cost-effectively by a non-chip-forming method with a high degree of repeat accuracy.

The supporting element, too, can be provided as a part formed from sheet metal. It is preferably firmly connected to the outer part, so that a pre-assembled unit is achieved.

In addition to the advantageous supporting conditions achievable, it is also possible to provide friction-reducing means between the control face and the contact face.

For a first embodiment it is proposed that the friction-reducing means comprise lubricating grooves which are annular in shape and are connected to a lubricant reservoir by means of lubricating bores. The dish-shaped chamber of the control element can be used as the lubricant reservoir.

The advantage of this embodiment is that it is possible to achieve high sliding speeds between the control face and the contact face when the joint rotates in an articulated condition. By selecting a suitable surface ratio between the lubricating grooves and the area of surface contact which occurs between the control face and the contact face when the outer part and inner part are in an aligned condition relative to one another, the high sliding speeds lead to a hydrodynamic condition of lubrication. The amount of friction thus becomes negligibly small, which means that overall, it is possible to achieve a long service life and reduce any transmission losses to a minimum. This also ensures a high degree of efficiency which, in turn, means that less heat is generated, so that it is possible to lubricate the constant velocity fixed joint with cheaper greases such as used for rolling contact bearings, for example.

Alternatively, the friction reducing means can be provided in the form of a rolling contact bearing which comprises a bearing cage for guiding bearing balls which, by the bearing cage, are rollingly held between the control face and the contact face. In this way it is possible to achieve supporting conditions and friction conditions which are similar to those of rolling contact bearings.

Particularly advantageous conditions can be achieved if the bearing cage is connected to the cage, so that the bearing cage controlled by the cage necessarily follows the movement of the latter. Two preferred embodiments of the invention are diagrammatically illustrated in the drawing wherein.

DETAILED DESCRIPTION OF THE PREFERRED EMBODIMENT

Figure 1:
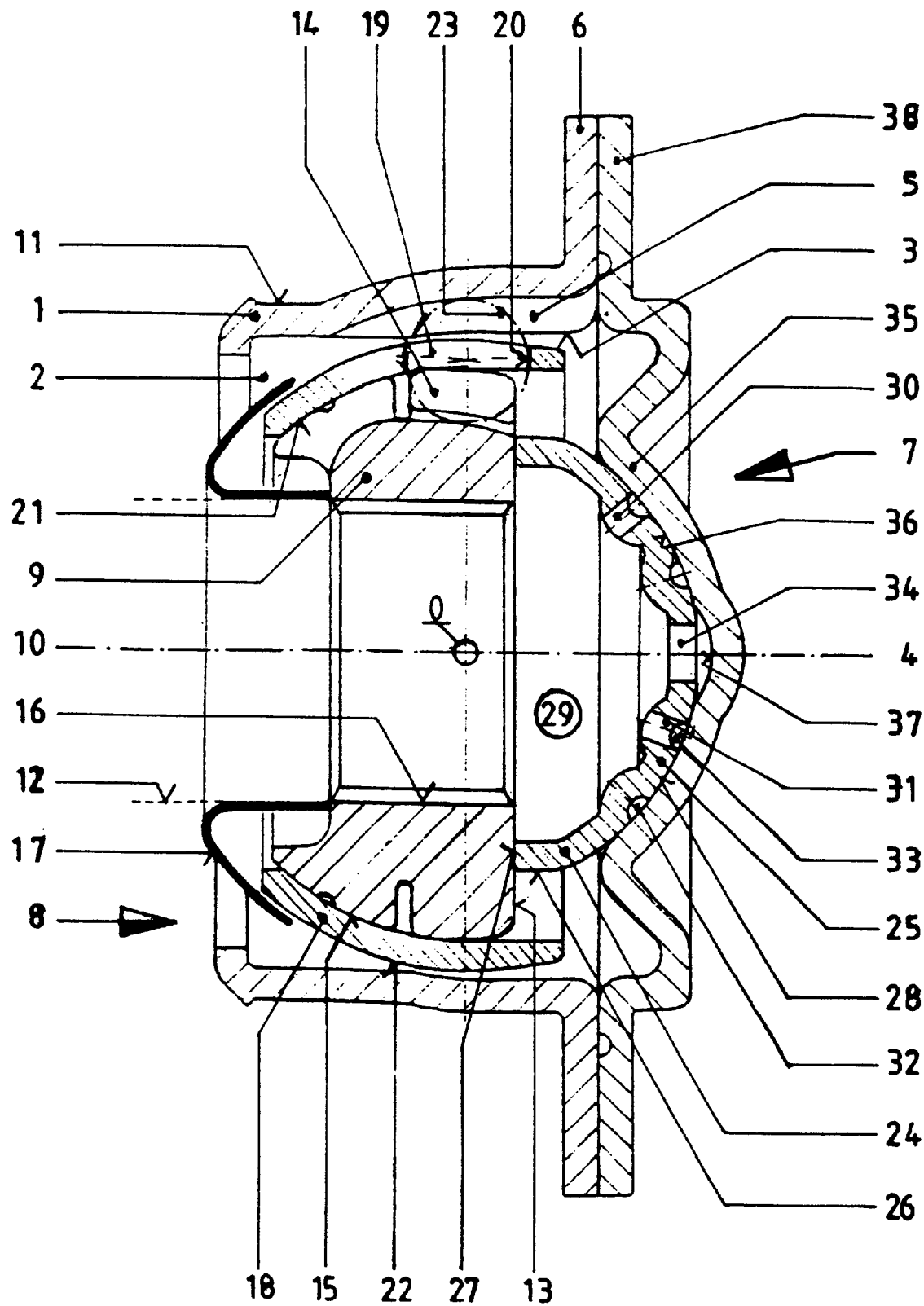
FIG. 1 is a longitudinal section through a first embodiment of an inventive constant velocity fixed joint in an aligned position, with friction bearing means between the control element and the supporting element.

FIG. 1 shows a first embodiment of an inventive constant velocity fixed joint having an outer part 1 which is provided in the form of a sheet metal part and which comprises a cavity 2 whose largest opening width is provided towards the first joint end 7. The cavity 2 is delimited by the inner face 3 and the circumferentially distributed outer running grooves 5 starting from the first joint end 7. The outer running grooves 5 extend from first joint end 7 in an undercut-free way and are arranged in meridian planes relative to the first longitudinal axis 4 of the outer joint part 1. Furthermore, the outer joint part, towards the first joint end 7, comprises an outwardly extending flange 6. Towards the second joint end 8, the outer joint part 1 comprises a reduced cross-section, with its outer face being provided with a seat face 11 for fixing the large diameter of a convoluted boot whose small diameter is intended to be fixed on a shaft 12 which is indicated by dashed lines and which extends out of the second joint end 8. The cavity 2 of the outer part 1 accommodates an inner part 9 which is illustrated in the drawing in such a way that the second longitudinal axis 10 of the inner part 9 coincides with the first longitudinal axis 4. The joint is in the aligned condition, i.e. the articulation angle is 0°. Towards the first joint end 7, the inner part 9 comprises the end face which serves as a supporting face 13 and which is arranged in such a way that the second longitudinal axis 10 is positioned perpendicularly on a plane formed by the supporting face 13. In the outer face of the inner part 9, there are arranged circumferentially distributed inner running grooves 14 in such way that always one inner running groove 9 is positioned opposite an outer running groove 5, so that they form pairs. The inner running grooves 14 are also arranged in meridian planes, with their track base being designed to be undercut-free, starting from the first joint end 7. Furthermore, the inner part 9, on its outer face extending towards the second joint end 8, comprises an outer spherical face 15 whose center is centered on the theoretical joint articulation center O. The inner part 9 is also provided with a toothed bore 16 which is centered on the second longitudinal axis 10 and whose purpose it is to receive a correspondingly toothed shaft 12. Furthermore, there is provided a retaining element 17 which stores the lubricant required for lubricating the outer spherical face 15.

The retaining element 17 partially overlaps a cage 18 which, in its interior, comprises a hollow spherical partial face 21. Cage 18 is guided on the outer spherical face 15 by the hollow spherical partial face 21. Furthermore, the cage 18 is provided with windows 19 which are circumferentially distributed in accordance with the pairs of inner running grooves 14 and outer running grooves 5 and which serve to receive balls 23 which project radially inwardly and outwardly beyond the cage 18 and engage the outer running grooves 5 and inner running grooves 14. When the balls 23 transmit torque, the cage 18, by means of its hollow spherical partial face 21, is held in contact with the outer spherical face 15 of the inner part 9. This is true because the balls 23 are supported on the window faces 20 of the windows 19, which window faces are near the first joint end 7, and, because of the undercut-free track shape starting from the first joint end 7, the balls 23 load the cage 18 towards the right in the direction of the first joint end 7. Over the entire articulation range, i.e. under all positions of articulation which can be assumed between the inner part 9 and the outer part 1 relative to one another, there always exists a distance between the outer face 22 of the cage 18 and the inner face 3 of the outer part 1. This means that the unit consisting of the inner part 9 and the cage 18 is radially centered relative to the outer part 1 by means of the balls 23. The inner part 9, by means of its supporting face 13, is supported on an annular guiding face 27 of a dish-shaped control element 24 which comprises a ball cup portion 25 and a cylindrical portion 26. Between the inner part 9 and the control element 24, a radial adjustment is possible on the faces mutually supporting one another, i.e. on the supporting face 13 and the guiding face 27. The spherical control face 28 of the control element 24 is provided with annular lubricating grooves 32, 33 which, by means of circumferentially distributed lubricating bores 30, 31, are connected to a lubricant reservoir 29 formed by the cup shape inside the control element 24 and filled with lubricant. In the case of the illustrated embodiment, two annular lubricating grooves 32, 33 are pressed into the control face 28. The control element 24 is provided with a central aperture 34 opposite which, in the aligned condition of the joint, there is arranged a corresponding recess 37 of a ball-cup-shaped contact face 36 of a supporting element 35. Contact face 36, otherwise, is contacted by the control element 24 by means of its spherical control face 28. The supporting element 35 is secured to the flange 6 of the outer part 1 by means of a flange 38. The centers of the spherical control face 28 and of the hollow spherical contact face 36 of the supporting element 35 are also centered on the theoretical articulation center O of the constant velocity fixed joint. By selecting a suitable ratio of area surface of the annular lubricant grooves 32, 33 and of the radii of the control face 28 and the contact face 36 relative to one another and taking into account the fact that, when the joint is articulated and rotates, it is possible to achieve high sliding speeds, because the control element 24 passes through the entire articulation range relative to the supporting element 35, the condition of hydro-dynamic lubrication can be achieved. Furthermore, by providing the recess 37 and the aperture 34 it is ensured that self-inhibition in the region of contact between the control face 28 and the contact face 36 cannot occur.

Figure 2:
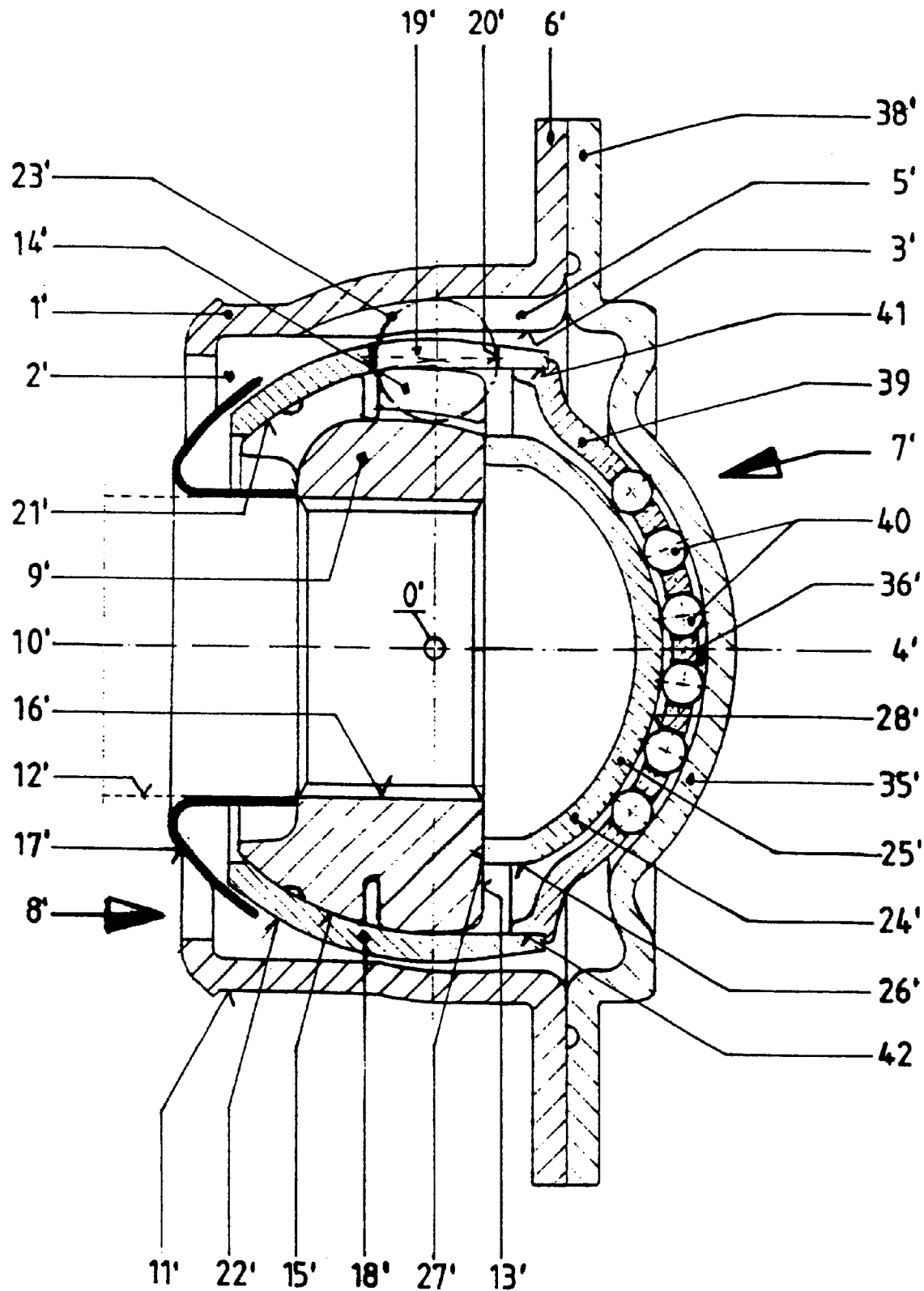
FIG. 2 is a longitudinal section through a further embodiment of an inventive constant velocity fixed joint, with rolling contact bearing means between the control element and the supporting element.

FIG. 2 shows the longitudinal section through a further embodiment of an inventive constant velocity universal joint having the outer part 1' in which a cavity 2' with the inner face 3' is formed. The outer part 1' comprises the first longitudinal axis 4' around which the outer running grooves 5' are distributed in the inner face 3' of the cavity 2'. The outer running grooves 5' extend in an undercut-free way from the first joint end 7'. Furthermore, at the first joint end 7', the outer part 1' is provided with a flange 6' which serves to connect the outer part 1' to a driving or driven component. As in the case of the embodiment according to FIG. 1, the outer part 1' is provided as a formed sheet metal part. It also comprises a seat face 11 for securing a convoluted boot. The second joint end 8' serves to introduce the shaft 12' which is indicated by dashed lines. The inner part 9' is received in the cavity 2' and comprises the second longitudinal axis 10', with the outer part 1' and the inner part 9' being illustrated in such a way that their longitudinal axes 4' and 10' coincide with one another. Towards the first joint end 7', the inner part 9' comprises a supporting face 13' which is arranged in such a way that the second longitudinal axis 10' is arranged perpendicularly on a plane formed by said supporting face 13'. From the supporting face 13', i.e. also from the first joint end 7', there extend the inner running grooves 14' worked into the outer face of the inner part 9'. The inner running grooves 14', like the outer running grooves 5', extend in meridian planes relative to the associated longitudinal axes 4' and 10'. Being undercut-free means that, starting from the supporting face 13', the track base of the inner running grooves 14' extends towards the second joint end 8' away from the associated longitudinal axis 10'. As compared thereto, the track base of the outer running grooves 5', starting from the first joint end 7', extends towards the second joint end 8' progressively approaching the associated first longitudinal axis 4'. Whereas the outer part 1' is provided as a formed sheet metal part, the inner part 9' is a solid part which can also be produced by a non-chip-forming method. On its outer face, the inner part 9' comprises an outer spherical face 15' which is arranged towards the second joint end 8'. Furthermore, the inner part 9' comprises a toothed bore 16' which is centered on its second longitudinal axis 10' and which serves to connect the shaft 12' in a rotationally fast way. Furthermore, there is provided a retaining element 17' for concentrating a lubricant reservoir in the vicinity of the outer spherical face 15' to ensure adequate lubrication of same. The divided retaining element 17' is secured to the shaft 12'. It extends over the outer face 22' of the cage 18' which, by means of a hollow spherical partial face 21', is slidingly guided on the outer spherical face 15'. The cage 18' is provided with windows 19' which are circumferentially distributed in accordance with the pairs of outer running grooves 5' and inner running grooves 14' which serve to receive the torque transmitting balls 23' which engage an outer running groove 5' and inner running groove 14' each and which, in all positions of articulation, are supported against window faces 20' arranged towards the first joint end 7' in order to hold the cage 18' by means of its hollow spherical partial face 21' in contact with the outer spherical face 15' of the inner part 9'. Between the outer face 22' of the cage 18' and the inner face 3' of the outer part 1', there is provided a space, so that, independently of the joint articulation, no contact can occur between the outer part 1' and the cage 18'. The inner part 9', by means of its supporting face 13', is supported against a guiding face 27' of a cylindrical portion 26' of a control element 24', which guiding face 27' is designed as an annular face. The dish-shaped control element 24' produced from sheet metal otherwise comprises a ball-cup-shaped spherical dish portion 25' whose control face 28' constitutes a spherical face whose center is centered on the theoretical joint articulation center O'. The windows 19' of the cage 18' and the window faces 20' are arranged in such a way that the centers of the balls 23' are also located in a plane containing the theoretical articulation center O'. The control face 28' serves as a running face for bearing balls 40 which are held in a bearing cage 39. The bearing cage 39 comprises a centering projection 41 by means of which it is held on a centering face 42 of the cage 18' in the region extending towards the first joint end 7', so that the bearing cage 39 carries out half the articulation angle carried out by the cage 18', when the outer part 1' and the inner part 9' are articulated relative to one another. The bearing balls 40 are supported against a ball-cup-shaped contact face 36' of a supporting element 35' which, by means of a flange 38', is connected to the flange 6' of the outer part 1'. The center of the contact face 36' in the shape of a hollow sphere is also centered on the theoretical articulation center O'. During assembly, the parts to be assembled and their respective functional faces can be selected in such a way that they ensure a combination wherein the balls 23' permit articulation of the constant velocity fixed joint around a center which is as close as possible to the theoretical articulation center O'. By selecting rolling contact bearing means it is also possible to achieve a considerable reduction in friction because the forces resulting from the transmission of torque and to be introduced by the control element 24' into the supporting element 35' can also be transmitted while being supported by a rolling contact bearing.

The above-described joints are preferably used in a drive line of a motor vehicle, i.e. they can be used both in the propeller shaft between the front drive unit and the rear axle and in the sideshafts which lead from the differential to the driven wheels. The joints are characterized by a long service life and low friction losses.

What is claimed is:

1. A constant velocity fixed joint comprising:
   an outer part having a first longitudinal axis and a cavity provided with outer running grooves;
   an inner part arranged in the cavity and defining a second longitudinal axis;
   an outer face of said inner part being provided with inner running grooves, said outer running grooves and said inner running grooves being arranged opposite one another in pairs and in meridian planes and extending in an undercut-free way from a first joint end;
   a cage having hollow spherical partial face supported on a corresponding outer spherical face of the inner part, said cage having windows distributed according to pairs of an outer running groove and an inner running groove;
   balls guided in the windows and supported on window faces arranged near the first joint end, with an outer face of the cage across the entire range of articulation covered by the inner joint part relative to the outer joint part being at a distance from the inner face of the cavity;
   a control element provided with a spherical control face and with a guiding face; and
   a supporting element having a hollow spherical contact face with the control element with its guiding face being supported on a supporting face of the inner part, on which supporting face the second longitudinal axis is positioned at a right angle, and, by means of its control face, being supported on the contact face, and with the supporting element being fixed to one of the outer part or a component connected to the outer part, and with the control element and the supporting element being arranged towards the first joint end.

2. A constant velocity fixed joint according to claim 1, characterized in that the control element is dish-shaped.

3. A constant velocity fixed joint according to claim 1, characterized in that the supporting element is provided as a part formed from sheet metal and connected to the outer part.

4. A constant velocity fixed joint according to claim 1, characterized in that friction-reducing means are effective between the control face and the contact face.

5. A constant velocity fixed joint according to claim 4, characterized in that the friction-reducing means comprise lubricating grooves connected to a lubricant reservoir by means of lubricating bores.

6. A constant velocity fixed joint according to claim 2, characterized in that the cavity provided by the dish shape serves as the lubricant reservoir.

7. A constant velocity fixed joint according to claim 4, characterized in that the friction-reducing means are provided in the form of a rolling contact bearing which comprises a bearing cage for guiding bearing balls which are rollingly held by said cage between the control face and the contact face.

8. A constant velocity fixed joint according to claim 7, characterized in that the bearing cage is connected to the cage.

9. A constant velocity fixed joint according to claim 5, wherein said lubricating grooves are annular.

* * * * *